United States Patent
Tanner

(10) Patent No.: US 8,954,518 B2
(45) Date of Patent: Feb. 10, 2015

(54) COMMUNICATION DEVICE

(75) Inventor: Peter Tanner, London (GB)

(73) Assignee: The Sorting Office Limited (GB)

( * ) Notice: Subject to any disclaimer, the term of this patent is extended or adjusted under 35 U.S.C. 154(b) by 134 days.

(21) Appl. No.: 13/060,077

(22) PCT Filed: Aug. 14, 2009

(86) PCT No.: PCT/GB2009/001996
§ 371 (c)(1),
(2), (4) Date: Feb. 22, 2011

(87) PCT Pub. No.: WO2010/020761
PCT Pub. Date: Feb. 25, 2010

(65) Prior Publication Data
US 2011/0145356 A1    Jun. 16, 2011

(30) Foreign Application Priority Data
Aug. 22, 2008   (GB) .................................. 0815467.6

(51) Int. Cl.
*G06F 15/16*     (2006.01)

(52) U.S. Cl.
USPC ........................... 709/206; 455/436; 455/466

(58) Field of Classification Search
USPC ............... 709/206, 226; 379/211.02, 142.06; 370/475; 705/14.52; 455/436, 466
See application file for complete search history.

(56) References Cited

U.S. PATENT DOCUMENTS

| | | | | |
|---|---|---|---|---|
| 6,738,462 | B1* | 5/2004 | Brunson | 379/142.06 |
| 7,587,493 | B1* | 9/2009 | Sheth | 709/226 |
| 2002/0080822 | A1* | 6/2002 | Brown et al. | 370/475 |
| 2006/0010218 | A1 | 1/2006 | Turcotte, II | |
| 2006/0259556 | A1 | 11/2006 | Auhagen | |
| 2007/0233795 | A1 | 10/2007 | Setlow et al. | |
| 2008/0075259 | A1* | 3/2008 | Trevallyn-Jones et al. | 379/211.02 |
| 2012/0095831 | A1* | 4/2012 | Aaltonen et al. | 705/14.52 |

FOREIGN PATENT DOCUMENTS

EP     1583301 A1     10/2005

OTHER PUBLICATIONS

PCT International Search Report and Written Opinion for International Application No. PCT/GB2009/001996 dated Oct. 26, 2009.

* cited by examiner

*Primary Examiner* — Dustin Nguyen
(74) *Attorney, Agent, or Firm* — Tumey L.L.P.

(57) ABSTRACT

A communication device comprising a processor arranged to select a first communication address for sending a first message to a first communication device and selecting a second communication address for sending a second message to the first communication device unless the first communication device has responded to the first message before the second message has been sent.

7 Claims, 1 Drawing Sheet

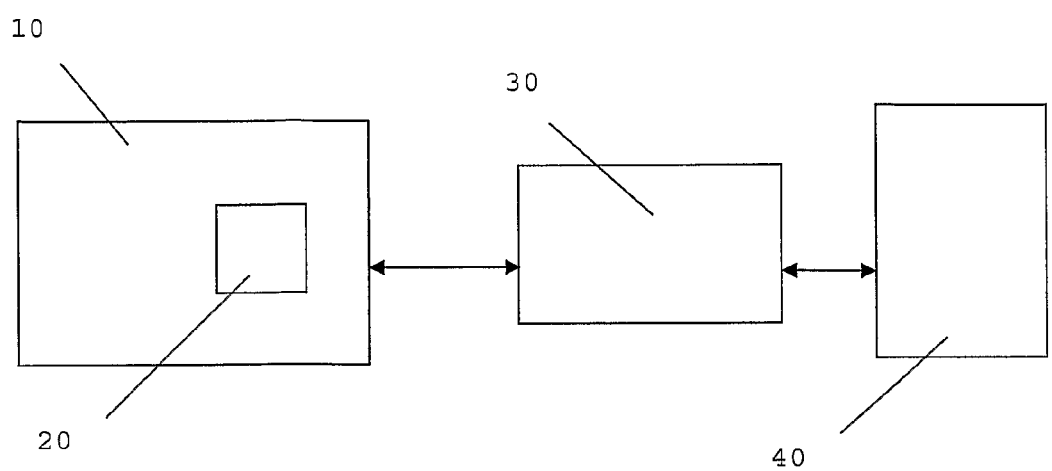

COMMUNICATION DEVICE

The present invention relates to a messaging device and in particular an apparatus for allowing an outgoing message to be paired with an end users response.

Increasingly businesses are attempting to improve efficiency by automating processes that typically have been performed by human interaction.

One such case relates to the issuing of electronic messages to an existing client base, where the electronic messages could take many different forms, for example SMS, email or MMS messages However, as a business may send out many messages in a day, which could be sent to many hundreds of people, it can be difficult and time consuming attempting to correlate a received message with a transmitted message. For example, if a series of SMS messages are sent to a client and the client responds to just one of these SMS messages it may be unclear to the original sender as to which one of the SMS messages the client is responding.

Accordingly, it is desirable to provide an automated process for correlating a received message with a transmitted message.

In accordance with an aspect of the present invention there is provided a communication device and a method according to the accompanying claims.

By using the sending address and the recipients communication address as identifiers this provides the advantage of allowing an outgoing message to be paired with an end users response to that message.

An embodiment of the invention will now be described, by way of example, with reference to the drawings, of which:

FIG. 1 illustrates a messaging system according to an embodiment of the present invention.

The following embodiment describes a messaging system that allows an outgoing message to be paired with an end users response, where the sending of any number of messages to a recipient or recipients (i.e. an end user that a message is intended for) can be paired with their associated responses.

FIG. 1 illustrates a message server 30 that is arranged to receive data from a first communication device 10. The message server 30 can receive the data from the first communication device 10 by any suitable means, for example via a local area network, the Internet or a telephone link and via a wired or wireless communication link. If the first communication device 10 is located remotely to the message server 30 it would be preferable for the communication link that is established between the first communication device 10 and the message server 30 to be secure. The message server is arranged to establish a communication link with a recipient communication device 40. The communication link between the message server 30 and the recipient 40 can be any suitable communication link.

The first communication device 10 includes a database 20, where, for illustrative purpose, the database 20 includes records having the following fields: a unique identifier, a message to be sent to a recipient and a communication address for the recipient. As would be appreciated by a person skilled in the art, the database records may include additional fields, for example a password for increased security or if different records within the database belong to different clients (i.e. an entity that wishes to send a message to a recipient) then a field to identify the client that the record belongs to.

If a number of messages within the database need to be sent to one or more recipients 40, where responses to the messages need to be tracked, the data from the respective database records is sent from the database 20 in the first communication device 10 to the message server 30. The message server 30 is then arranged to send the respective messages to appropriate recipient(s), as described below. The message server 30 includes means (not shown) for receiving and transmitting a message. As a person skilled in the art would appreciate the mechanism for receiving and transmitting a message will depend upon the type of message being sent and the type of communication system that message server 30 forms part off. For example, the messages may be email, SMS or MMS or any other suitable form of electronic message and the message system may be part of a computer network or a telephone system. The message server 30 also includes a processor (not shown) for performing the processing steps required of the message server 30.

The process for allowing an outgoing message to be paired with a recipients response by the message server 30 will now be described.

First, the message server 30 selects a communication address for sending an initial message from. The communication address is selected to be different to any other communication addresses that have been used to send a message to the intended recipient and to which the intended recipient has not yet responded. When a response from the recipient 40 is received, which should be sent back to the originating communication address, the message server is able to pair the response with relevant message that is being responded too by determining which message was sent to the recipient from the communication address the response was received at.

For example, based on a text messaging system, if a first text message is sent from the message server on telephone number 0123456789 to a recipient on telephone number 0987654321 and the telephone number 0123456789 has not been used to send any other message to 0987654321 then upon receipt of a message at telephone number 0123456789 from 0987654321 the message from 0987654321 must be in response to the earlier message.

It should be noted, however, that although the above embodiment describes a text messaging system, as stated above any suitable messaging system may be used, for example email or MMS.

Accordingly, upon receipt at the message server 30 of record data from the first communication device 10 the message server 30 selects a unique communication address pairing for each message that is to be sent to a recipient 40. For example, for each message to be sent to a recipient 40 the message server 30 selects the next available communication address from a pool of pre-set communication addresses and uses the sequence of communication addresses to deliver respective messages to the recipient 40. Upon receipt of a response from the recipient 40 the message server 30 is able to pair the received response with the sent message based on the communication address that the original message was sent from and the communication address of the device sending the response.

Once a response to a message has been received the relevant communication address that the original message was sent from can be freed up for use with another message that needs to be sent to the recipient.

Clearly, as the message/response pairing is determined on unique pairing of receiving and transmitting communication addresses, the message server 30 can use the same communication addresses for different recipients.

From the pool of pre-set communication addresses, a communication address is available if any of the following is true:
1) A communication address has not been used to send a message to a specific communication address of a recipient (i.e. the communication address may have been used to send messages to communication addresses associated with different recipients but not the same recipient. That is to say, the combination of sending and receiving communication addresses are used to allow a pairing between a transmitted message and response to be made).

2) A communication address has been used as in 1) above but the recipient of the previous message has replied to that message, thereby freeing up this communication address for further use with the same recipient.

Optionally, the message server 30 can be configured to provide an alert if the number of unique communication addresses for a given recipients communication address falls below a predetermined number.

Once the message server 30 has paired a response with a transmitted message the response is forwarded to the first communication device 10 with the unique identifier that was associated with the original message in the database record, thereby allowing the first communication device 10 to determine which message the response is associated with. Any suitable form for communicating the response to the first communication device 10 can be used, for example:

1) Leaving the message in a personal message box where the first communication device 10 can download content at intervals (similar to how email works)

2) Using a standard POP mailbox.

3) POST or GET calls to a URL with the relevant variables

4) For certain technologies (such as COM) a persistent link to a socket can be made (similar to how messaging programs work) and an immediate notification of a response can be made using this link. Any messages that cannot be delivered (if the link fails etc) are queued until they can be. This is similar to how instant messaging works.

For increased security, information that may be stored in the database 20 of the first communication device 10, for example recipient details and/or message content, could be stored in the message server and the first communication device 10 can initiate a message transmission from the message server 30 to a recipient 40 by the use of a job number with an identifier. The job number can be used to identify to the message server 30 the recipient and message to the sent to the recipient. The identifier has the same purpose as the unique identifier as used in the above embodiment.

The first communication device 10 can be configured with a control panel (not shown) that allows a user of the first communication device 10 to control the use of the message server 30. The control panel can be used to:

1) Pre-load user information and standard messages to minimise the relay of sensitive data and allow for easy scheduling of future or ongoing messages.

2) Define message sending schedules

3) Create/edit/manage user profiles. A user can be of the following types:
   a. Operator—Access all features except user manager, billing info and reports
   b. Administrator—Can also edit users, view billing information and review reports
   c. Super user—Can create companies and view all companies 4) Pre-load a list of communication addresses and create groups of addresses so that a message can be sent to a whole distribution list as well as individuals.

5) Review inbound messages

6) View a range of reports

7) View logs of inbound and outbound messages.

8) Use a special merge syntax to perform mail merges

9) Billing manager—View invoices, make payments

It will be apparent to those skilled in the art that the disclosed subject matter may be modified in numerous ways and may assume embodiments other than the preferred forms specifically set out as described above, for example the message server 30 can be arranged to received requests to send messages from a number of different communication devices.

What is claimed:

1. A message server comprising message receiving means, message transmitting means, and a processor; all the messages being of the same form of electronic message, and the message server being adapted to pair any number of messages to a recipient communication device with the associated responses; the message server being arranged to receive messages from a first communication device for sending to recipient communication devices, and the processor having a pool of pre-set communication addresses for sending a message from, wherein the processor is arranged to select a first communication address from which a first message is to be sent to a plurality of recipient communication devices and arranged to select a second communication address from which a second message is to be sent to at least one of the plurality of recipient communication devices unless the at least one of the plurality of recipient communication devices has responded to the first message before the second message has been sent, wherein the processor is arranged to correlate a received message from the at least one of the plurality of recipient communication devices with a sent message by correlating the communication address that the received message has been sent from with the communication address that the received message has been received at; wherein the messages from the first communication device are to be sent to the recipient communication devices, wherein as regards each message from the first communication device the message server is arranged to receive data that includes the message and an identifier from the first communication device and is arranged to establish a communication link with the recipient communication devices; wherein the message server is arranged to communicate the received message to the first communication device along with the identifier associated with the sent message.

2. A message server according to claim 1, wherein if the at least one of the recipient communication devices has responded to the first message before the second message has been sent, sending the second message from the first communication address.

3. A message server according to claim 1, wherein the messages are SMS messages, or the messages are email, or the messages are MMS messages.

4. A method of communicating a message from a first communication device to one or more recipient communication devices, all the messages being of the same form of electronic message, and the method enabling any number of messages to a recipient communication device to be paired with the associated responses, the method comprising transmitting the message from the first communication device to a message server, and selecting, at the message server, from a pool of pre-set communication addresses for sending a message from, a first communication address from which is to be sent a first message to a plurality of recipient communication devices and selecting, at the message server, a second communication address from which is to be sent a second message to at least one of the plurality of recipient communication devices unless the at least one of the plurality of recipient communication devices has responded to the first message before the second message has been sent, and correlating, at the message server, a received message from the at least one of the plurality of recipient communication devices with a sent message by correlating the communication address that the received message has been sent from with the communication address that the received message has been received at; wherein messages from the first communication device are to be sent to recipient communication devices, and wherein as regards each message the message server receives data that includes the message and an identifier from the first communication device; and wherein the message server, after correlating the received message with the sent message, then communicate the received message to the first communication device along with the identifier associated with the sent message.

5. A method according to claim 4, wherein the messages are SMS messages, or the messages are emails, or the messages are MMS messages.

6. A message server according to claim 1, also comprising means to provide an alert if the number of pre-set communication addresses available for sending a message to a given recipient communication device falls below a predetermined number.

7. A method according to claim 4, also comprising providing an alert if the number of pre-set communication addresses available for sending a message to a given recipient communication device falls below a predetermined number.

* * * * *